(12) United States Patent
Newstadt et al.

(10) Patent No.: US 9,832,221 B1
(45) Date of Patent: Nov. 28, 2017

(54) SYSTEMS AND METHODS FOR MONITORING THE ACTIVITY OF DEVICES WITHIN AN ORGANIZATION BY LEVERAGING DATA GENERATED BY AN EXISTING SECURITY SOLUTION DEPLOYED WITHIN THE ORGANIZATION

(75) Inventors: Keith Newstadt, West Newton, MA (US); Javier Santoyo, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 1073 days.

(21) Appl. No.: 13/291,773

(22) Filed: Nov. 8, 2011

(51) Int. Cl.
  G06F 15/173 (2006.01)
  H04L 29/06 (2006.01)
  G06F 21/55 (2013.01)

(52) U.S. Cl.
  CPC .......... H04L 63/145 (2013.01); G06F 15/173 (2013.01); H04L 63/1408 (2013.01); H04L 63/1441 (2013.01); G06F 21/552 (2013.01)

(58) Field of Classification Search
  CPC ... G06F 15/173; G06F 21/552; H04L 63/145; H04L 63/1408; H04L 63/1441
  USPC ........................................................ 709/224
  See application file for complete search history.

(56) References Cited

U.S. PATENT DOCUMENTS

| | | | |
|---|---|---|---|
| 6,397,256 B1 * | 5/2002 | Chan ................. | G06F 17/30873 707/E17.111 |
| 7,269,851 B2 | 9/2007 | Ackroyd | |
| 7,818,343 B1 * | 10/2010 | Sekhar et al. ................ | 707/781 |
| 7,831,412 B1 | 11/2010 | Sobel et al. | |
| 7,966,278 B1 | 6/2011 | Satish | |
| 8,554,907 B1 * | 10/2013 | Chen et al. .................. | 709/224 |
| 2002/0111887 A1 * | 8/2002 | McFarlane ............ | G06Q 10/10 705/30 |
| 2003/0055994 A1 * | 3/2003 | Herrmann et al. .......... | 709/229 |
| 2004/0205167 A1 | 10/2004 | Grumann | |
| 2005/0021733 A1 | 1/2005 | Clinton et al. | |

(Continued)

OTHER PUBLICATIONS

Sourabh Satish; U.S. Appl. No. 12/049,751, filed Mar. 17, 2008.

(Continued)

*Primary Examiner* — Tonia L Dollinger
*Assistant Examiner* — Adam Cooney
(74) *Attorney, Agent, or Firm* — FisherBroyles LLP

(57) ABSTRACT

A computer-implemented method for monitoring the activity of devices within an organization by leveraging data generated by an existing security solution deployed within the organization may include (1) identifying, at a reputation service configured to service reputation requests, at least one external IP address associated with an organization, (2) identifying, within the reputation requests serviced by the reputation service, a plurality of reputation requests that originated from the external IP address associated with the organization, (3) generating, based at least in part on an analysis of the reputation requests that originated from the external IP address associated with the organization, at least one report for the organization that identifies the activity of devices within the organization, and (4) providing the report to the organization to enable the organization to monitor the activity of the devices within the organization. Corresponding systems and encoded computer-readable media are also disclosed.

20 Claims, 7 Drawing Sheets

(56) References Cited

U.S. PATENT DOCUMENTS

| | | | |
|---|---|---|---|
| 2005/0283622 A1 | 12/2005 | Hall et al. | |
| 2005/0283831 A1 | 12/2005 | Ryu et al. | |
| 2006/0253584 A1 | 11/2006 | Dixon et al. | |
| 2007/0016953 A1 | 1/2007 | Morris et al. | |
| 2007/0073660 A1* | 3/2007 | Quinlan | 707/3 |
| 2007/0162458 A1 | 7/2007 | Fasciano | |
| 2007/0300215 A1 | 12/2007 | Bardsley | |
| 2008/0141240 A1 | 6/2008 | Uthe | |
| 2008/0298568 A1* | 12/2008 | Karandikar | G06Q 30/04 379/114.03 |
| 2009/0133126 A1 | 5/2009 | Jang et al. | |
| 2009/0138856 A1 | 5/2009 | Oja et al. | |
| 2011/0083180 A1* | 4/2011 | Mashevsky et al. | 726/23 |

OTHER PUBLICATIONS

Non-Final Office Action received in U.S. Appl. No. 12/049,751; dated Jun. 24, 2011.

Final Office Action received in U.S. Appl. No. 12/049,751; dated Jan. 19, 2012.

William E. Sobel et al.; U.S. Appl. No. 12/059,003, filed Mar. 31, 2008.

Non-Final Office Action received in U.S. Appl. No. 12/059,003; dated Aug. 18, 2011.

Sourabh Satish et al.; U.S. Appl. No. 11/394,846, filed Mar. 31, 2006.

Non-Final Office Action received in U.S. Appl. No. 11/394,846; dated Mar. 6, 2009.

Final Office Action received in U.S. Appl. No. 11/394,846; dated Sep. 1, 2009.

Non-Final Office Action received in U.S. Appl. No. 11/394,846; dated Feb. 23, 2010.

Final Office Action received in U.S. Appl. No. 11/394,846; dated Jul. 22, 2010.

Non-Final Office Action received in U.S. Appl. No. 11/394,846; dated Dec. 9, 2010.

Final Office Action received in U.S. Appl. No. 11/394,846; dated May 12, 2011.

Carey S. Nachenberg; U.S. Appl. No. 12/415,834, filed Mar. 31, 2009.

Non-Final Office Action received in U.S. Appl. No. 12/415,834; dated Oct. 11, 2011.

Sourabh Satish; Method for Determining the Health Impact of an Application Based on Information Obtained from Like-Profiled Computing Systems Using Clustering; Mar. 27, 2008; U.S. Appl. No. 12/056,379.

* cited by examiner

```
                              Report
                               502
------------------------------------------------------------------------
************************************************************
Organization: ExampleCorp., Inc.
Date Range: 2011-11-09 to 2011-12-09 (12:00:00 UTC)
Total Devices: 239 (197 managed, 42 unmanaged)
Total Policy Violations: 179 (19 managed, 160 unmanaged)
Total Malware Detections: 43 (2 managed, 41 unmanaged)
************************************************************

------------------------------------------------------------------------
************************************************************
Office Breakdown
************************************************************
Los Angeles, CA
************************************************************
Devices: 164 (133 managed, 31 unmanaged)
Policy Violations: 131 (11 managed, 120 unmanaged)
Malware Detections: 31 (2 managed, 29 unmanaged)
************************************************************
Sacramento, CA
************************************************************
Devices: 75 (64 managed, 11 unmanaged)
Policy Violations: 48 (8 managed, 40 unmanaged)
Malware Detections: 12 (0 managed, 12 unmanaged)
************************************************************

------------------------------------------------------------------------
************************************************************
Malware Detections
************************************************************
DeviceID=21EC2020-3AEA-1069-A2DD-08002B30309D
Managed=yes
FileName=foo.exe
FileHash=0xEF90349
```

*FIG. 5*

SYSTEMS AND METHODS FOR MONITORING THE ACTIVITY OF DEVICES WITHIN AN ORGANIZATION BY LEVERAGING DATA GENERATED BY AN EXISTING SECURITY SOLUTION DEPLOYED WITHIN THE ORGANIZATION

BACKGROUND

Network administrators are often tasked with monitoring and/or managing the data accessed, and/or activities of, computing devices within an organization. For example, network administrators may be tasked with identifying users of computing devices within an organization that access malicious and/or otherwise inappropriate websites, download malicious, destructive, illegal, or simply undesirable applications, receive or open spam or phishing spam emails, or the like.

Unfortunately, the cost and resources required to deploy and maintain an infrastructure capable of monitoring and/or managing such activities may be substantial or even prohibitive for many organizations. Moreover, even if an organization can afford to deploy and maintain such an infrastructure, this infrastructure may be unable to monitor and/or manage the activity of non-sanctioned or employee-owned devices deployed within the organization (which, given the recent trend towards the consumerization of IT, may represent a significant issue for many organizations). As such, the instant disclosure identifies a need for improved systems and methods for monitoring and/or managing devices within an organization.

SUMMARY

As will be described in greater detail below, the instant disclosure generally relates to systems and methods for enabling an organization to leverage data generated by existing security solutions deployed within the organization in order to effectively monitor and/or manage the activity of devices within the organization. In one example, a computer-implemented method for performing such a task may include (1) identifying, at a reputation service configured to service reputation requests, at least one external IP address associated with an organization, wherein each reputation request serviced by the reputation service represents a request for information relevant to evaluating the trustworthiness of a computing resource, (2) identifying, within the reputation requests serviced by the reputation service, a plurality of reputation requests that originated from the external IP address associated with the organization, (3) generating, based at least in part on an analysis of the reputation requests that originated from the external IP address associated with the organization, at least one report for the organization that identifies the activity of devices within the organization, and then (4) providing the report to the organization to enable the organization to monitor the activity of the devices within the organization.

In some examples, identifying the external IP address associated with the organization may include receiving the external IP address from the organization. The external IP address associated with the organization may represent a static and/or a dynamic IP address assigned to the organization.

In one example, each of the reputation requests that originated from the external IP address associated with the organization may include a unique identifier that uniquely identifies the device that generated the reputation request. Each reputation request may also include information that indicates whether the device that generated the reputation request represents a managed or approved device.

Generating the report may involve including any of a variety of information within the report that may aid the organization in monitoring and/or managing the activity of devices within the organization. In one embodiment, generating the report for the organization may involve including information within the report that identifies computing resources accessed by devices within the organization. In another example, generating the report for the organization may involve including information with the report that identifies at least one conclusion drawn by analyzing the reputation requests that originated from the external IP address associated with the organization.

Generating the report for the organization may also involve including information within the report that identifies the number of unmanaged devices within the organization and/or information that contrasts the activity of managed devices within the organization with the activity of unmanaged devices within the organization. In addition, generating the report for the organization may involve including information within the report that identifies potential relationships between computing resources accessed by the devices within the organization. Generating the report may also involve organizing information within the report by specific offices of the organization and/or specific geographic areas.

In some examples, providing the report to the organization may include providing the report on a periodic basis and/or providing the report in response to determining that a predetermined alert threshold has been satisfied.

In one embodiment, a system for implementing the above-described method may include an identification module programmed to (1) identify, at a reputation service configured to service reputation requests, at least one external IP address associated with an organization, wherein each reputation request serviced by the reputation service represents a request for information relevant to evaluating the trustworthiness of a computing resource, and (2) identify, within the reputation requests serviced by the reputation service, a plurality of reputation requests that originated from the external IP address associated with the organization. The system may also include a report module programmed to generate, based at least in part on an analysis of the reputation requests that originated from the external IP address associated with the organization, at least one report for the organization that identifies the activity of devices within the organization. The system may also include a communication module programmed to provide the report to the organization to enable the organization to monitor the activity of the devices within the organization. The system may also include at least one processor configured to execute the identification module, the report module, and the communication module.

In some examples, the above-described method may be encoded as computer-readable instructions on a computer-readable-storage medium. For example, a computer-readable-storage medium may include one or more computer-executable instructions that, when executed by at least one processor of a reputation service, may cause the reputation service to (1) identify, at the reputation service, at least one external IP address associated with an organization, wherein the reputation service is configured to service reputation requests for information relevant to evaluating the trustworthiness of a computing resource, (2) identify, within the reputation requests serviced by the reputation service, a plurality of reputation requests that originated from the external IP address associated with the organization, (3) generate, based at least in part on an analysis of the reputation requests that originated from the external IP address associated with the organization, at least one report for the organization that identifies the activity of devices within the organization, and then (4) provide the report to the organization to enable the organization to monitor the activity of the devices within the organization.

As will be explained in greater detail below, by leveraging data generated by an existing security solution deployed within an organization (such as antivirus software configured to generate reputation requests for information relevant to evaluating the trustworthiness of computing resources encountered by devices within the organization), the systems and methods described herein may be able to effectively monitor the activity of devices within the organization. In addition, by generating detailed reports for the organization based on an analysis of this data, the systems and methods described herein may enable such an organization to effectively monitor and/or manage both sanctioned and non-sanctioned (e.g., employee-owned) devices within the organization without having to deploy and/or maintain additional costly and/or burdensome device-management software, potentially reducing both the organization's costs and management burden.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary report generated for an organization based on data gathered from an existing security solution deployed within the organization.

Figure 1:
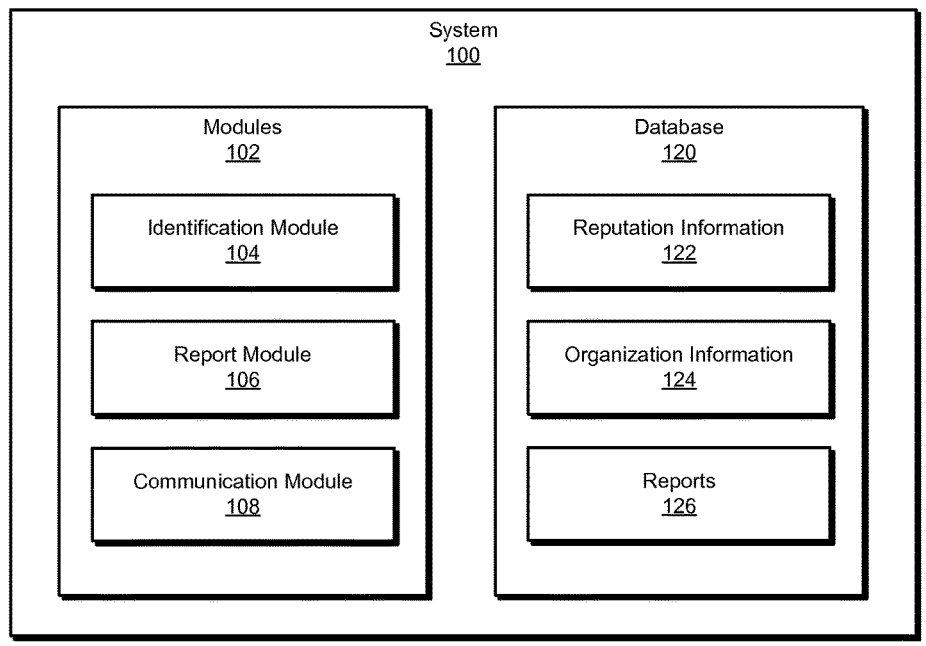
FIG. 1 is a block diagram of an exemplary system for monitoring the activity of devices within an organization by leveraging data generated by an existing security solution deployed within the organization.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
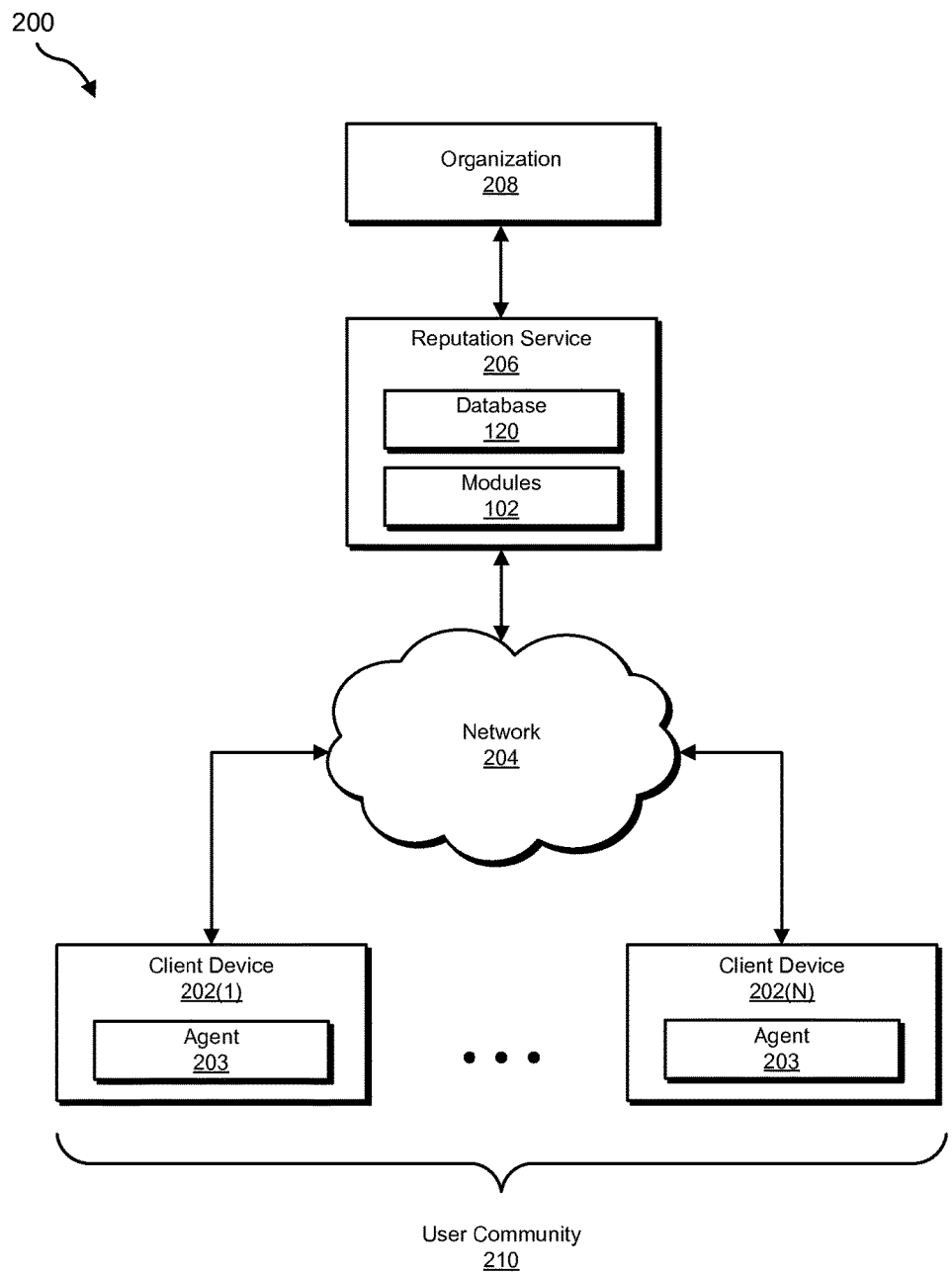
FIG. 2 is a block diagram of an exemplary system for monitoring the activity of devices within an organization by leveraging data generated by an existing security solution deployed within the organization.

The following will provide, with reference to FIGS. 1-2, detailed descriptions of exemplary systems for monitoring the activity of devices within an organization by leveraging data generated by an existing security solution deployed within the organization. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for monitoring the activity of devices within an organization by leveraging data generated by an existing security solution deployed within the organization. As illustrated in this figure, exemplary system 100 may include one or more modules 102 for performing one or more tasks. For example, and as will be explained in greater detail below, exemplary system 100 may include an identification module 104 programmed to (1) identify, at a reputation service configured to service reputation requests for information relevant to evaluating the trustworthiness of a computing resource, at least one external IP address associated with an organization and (2) identify, within the reputation requests serviced by the reputation service, a plurality of reputation requests that originated from the external IP address associated with the organization.

The system may also include a report module 106 programmed to generate, based at least in part on an analysis of the reputation requests that originated from the external IP address associated with the organization, at least one report for the organization that identifies the activity of devices within the organization. The system may also include a communication module 108 programmed to provide the report to the organization to enable the organization to monitor the activity of the devices within the organization. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., reputation service 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. As will be described in greater detail below, database 120 may be configured to store reputation information 122 for computing resources, organization information 124 for various organizations serviced by reputation service 206, and reports 126 for the various organizations serviced by reputation service 206.

Database 120 may represent portions of a single database or computing device or a plurality of databases or computing devices. For example, database 120 may represent a portion of client devices 202(1)-(N) and/or reputation service 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as client devices 202(1)-(N) and/or reputation service 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a plurality of client devices 202(1)-(N) in communication with a reputation service 206 via a network 204. System 200 may also include at least one organization 208 serviced by reputation service 206.

In one embodiment, one or more of modules 102 from FIG. 1 may, when executed by at least one processor of reputation service 206, enable reputation service 206 to monitor the activity of devices within an organization by leveraging data generated by an existing security solution deployed within the organization. For example, and as will be described in greater detail below, one or more of modules 102 may cause reputation service 206 to (1) identify at least one external IP address associated with organization 208, (2) identify, within the reputation requests serviced by reputation service 206, a plurality of reputation requests that originated from the external IP address associated with organization 208, (3) generate, based at least in part on an analysis of the reputation requests that originated from the external IP address associated with organization 208, at least one report for organization 208 that identifies the activity of devices within organization 208, and then (4) provide the report to organization 208 to enable organization 208 to monitor the activity of devices within organization 208.

Client devices 202(1)-(N) generally represent any type or form of computing device capable of reading computer-executable instructions. Examples of client devices 202(1)-(N) include, without limitation, laptops, desktops, servers, cellular phones, personal digital assistants (PDAs), multimedia players, embedded systems, combinations of one or more of the same, exemplary computing system 610 in FIG. 6, or any other suitable computing device. In one example, client devices 202(1)-(N) may represent computing devices within a user community (e.g., user community 210), such as an enterprise or the user base of a security solutions provider. One or more of client devices 202(1)-(N) may also represent devices within an organization, such as organization 208.

In one example, each of client devices 202(1)-(N) may include an agent 203. In this example, agent 203 may represent a security solution (e.g., antivirus software) configured to, upon identifying an attempt by a client device to access a computing resource, generate and transmit a reputation request to reputation service 206 for information relevant to evaluating the trustworthiness of the computing resource. In some examples, agent 203 may then use this information to determine whether to allow the client device to access the computing resource in question.

Reputation service 206 generally represents any type or form of computing subsystem (such as a reputation service) capable of generating and/or obtaining information that identifies the reputation of an object or entity, such as a file, website, or gateway. As will be explained in greater detail below, in some examples reputation service 206 may generate such information by collecting, aggregating, and analyzing data from potentially millions of user devices within a community (such as an enterprise or user base of a security solutions provider).

Organization 208 generally represents any type or form of entity or group, commercial or otherwise. In some examples, organization 208 may include one or more of client devices 202(1)-(N).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between client devices 202(1)-(N), reputation service 206, and/or organization 208.

Figure 3:
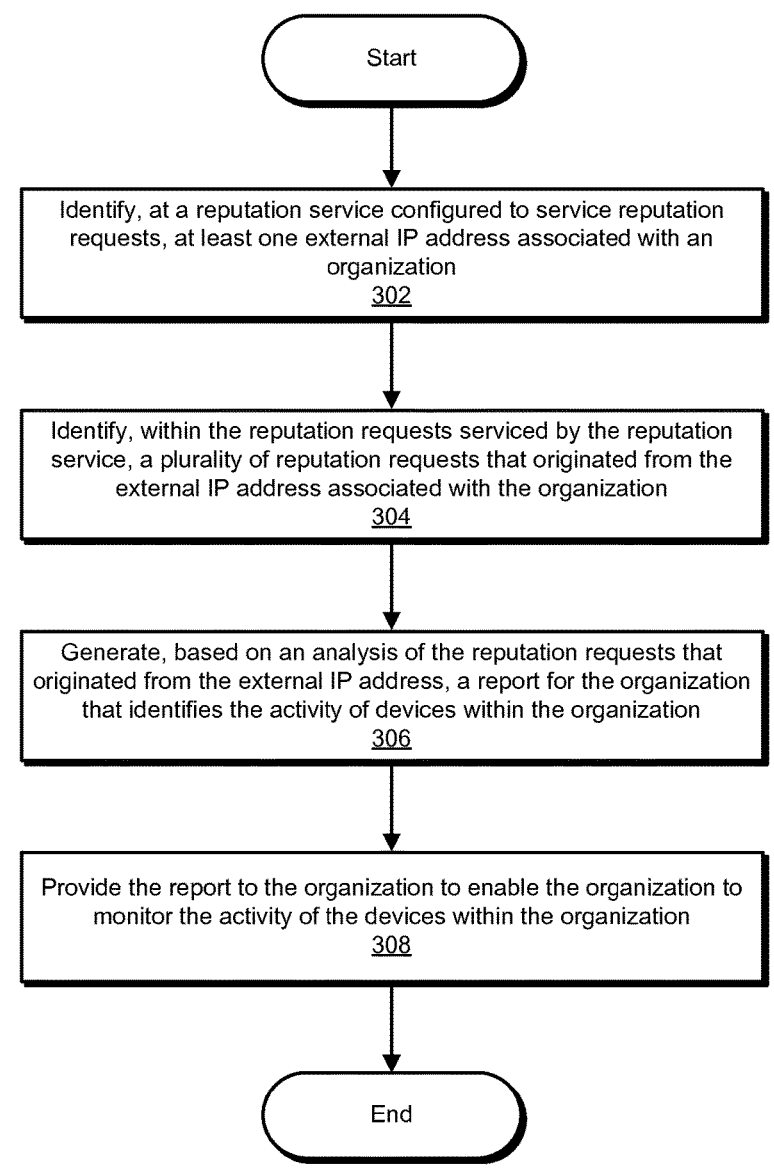
FIG. 3 is a flow diagram of an exemplary method for monitoring the activity of devices within an organization by leveraging data generated by an existing security solution deployed within the organization.

FIG. 3 is a flow diagram of an exemplary computer-implemented method 300 for monitoring the activity of devices within an organization by leveraging data generated by an existing security solution deployed within the organization. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify at least one external IP address associated with an organization. For example, identification module 104 may, as part of reputation service 206 in FIG. 2, identify an external IP address (or block of external IP addresses) associated with organization 208.

As indicated above, in some examples identification module 104 may perform step 302 as part of a reputation service. The term "reputation service," as used herein, refers to a system or device configured to service or respond to reputation requests generated by security solutions installed on devices within a user community. In addition, the term "reputation request" refers to a request from a device (generated by, e.g., a security solution installed on the device) to a reputation service for information relevant to evaluating the trustworthiness of a computing resource encountered by the device. Finally, the term "computing resource," as used herein, refers to any physical or virtual computing component that may be accessed by a computing device. Examples of computing resources include, without limitation, files (e.g., executables), remote resources (e.g., websites), devices (e.g., routers, servers, gateways, etc.), or any other virtual or physical component for which a trustworthiness evaluation may be necessary.

In some examples, one or more of the reputation requests serviced by the reputation service may include a unique identifier (such as a globally unique identifier (GUID)) that uniquely identifies the device that generated the reputation request. One or more of these reputations request may also include information that indicates whether the device that generated the request represents a managed device. The term "managed device," as used herein, refers to a device whose activity is actively monitored by an organization (using, e.g., monitoring software installed on the device). The term "unmanaged device," in contrast, refers to a device whose activity is not actively monitored by an organization (i.e., a device on which device-monitoring software has not been installed).

Figure 4:
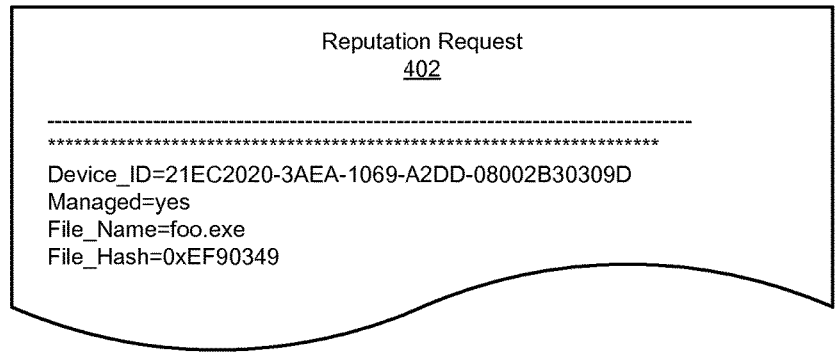
FIG. 4 is an illustration of an exemplary reputation request generated by an existing security solution deployed within an organization.

FIG. 4 is an illustration of an exemplary reputation request 402. As illustrated in this figure, reputation request 402 may contain a unique identifier associated with the device responsible for generating the request (e.g., "Device_ID=21EC2020-3AEA-1069-A2DD-08002B30309D"), information that indicates whether the device responsible for generating the request represents a managed device (e.g., "Managed=yes"), information that uniquely identifies the computing resource for which reputation information is requested (which, in this case, is a file, as identified by its file name "File_Name=foo.exe" and file hash "File_Has=0Xef09349), and/or any other potentially useful information.

In one example, the reputation requests serviced by the reputation service may originate from security solutions installed on devices within the user community. For example, agent 203 on each of client devices 202(1)-(N) in FIG. 2 may represent a security solution (e.g., antivirus software) configured to, upon identifying an attempt by a client device to access a computing resource, generate and transmit a reputation request to reputation service 206 for information relevant to evaluating the trustworthiness of the computing resource. In some examples, agent 203 may then use this information in determining whether to allow the client device to access the computing resource in question.

Reputation services may service or respond to reputation requests in a variety of ways. In one example, a reputation service may respond to a reputation request by providing reputation information for the computing resource in question to the requesting device. The term "reputation information," as used herein, refers to information that conveys the opinion of a specific community (such as the user base of a security solutions provider) on the trustworthiness or legitimacy of a computing resource, such as an executable file or website. The reputation of a computing resource may be conveyed in a variety of ways; including, for example, through the use of reputation scores (where, for example, high reputation scores indicate that a computing resource, such as a file or website, is generally trusted within a community and low reputation scores indicate that a computing resource is generally untrusted within a community), simple binary classifications (e.g., "trusted" or "untrusted"), prevalence information (e.g., information that identifies the number or percentage of user devices within a community that have accessed a particular computing resource), or any other information that may be used to identify a community's opinion on the trustworthiness or legitimacy of a computing resource.

In some examples, reputation services (such as reputation service 206 in FIG. 2) may generate reputation information for computing resources by collecting, aggregating, and analyzing data from devices within a user community (such as the user base of a security solutions provider). Examples of data gathered from devices within a user community that may be used to generate reputation information for computing resources include, without limitation, information that identifies the overall health of a device (i.e., information that identifies the performance, stability, and/or state of security of a device), information that identifies the computing resources that have been accessed by a device, information that identifies the impact of a computing resource on the health of a device (e.g., information that identifies the health of the device both before and after the device accessed the computing resource), and any other information that may be used to evaluate the trustworthiness of a computing resource. In some examples, by collecting, aggregating, and analyzing this data from potentially millions of devices within a user community (such as the user base of a security solutions provider), reputation services may be able to gain a fairly accurate understanding as to the trustworthiness of a computing resource.

Identification module 104 may perform step 302 in a variety of ways. In one example, identification module 104 may identify an external IP address associated with an organization by receiving the external IP address from the organization itself. For example, organization 208 may, during a registration process administered by reputation service 206, provide its external IP address (or addresses) to reputation service 206. In some examples, this external IP address (or addresses) may represent a static IP address (or addresses) assigned to organization 208. In other examples, this external IP address (or addresses) may represent a dynamic IP address (or addresses). If the external IP address (or addresses) represents a dynamic IP address (or addresses), then in some examples organization 208 may use dynamic DNS techniques to periodically report its dynamic IP address (or addresses) to reputation service 206.

Returning to FIG. 3, at step 304 the systems described herein may identify, within the reputation requests serviced by the reputation service, a plurality of reputation requests that originated from the external IP address(es) associated with the organization. For example, identification module 104 may, as part of reputation service 206 in FIG. 2, identify a plurality of reputation requests that originated from the external IP address(es) identified in step 302.

The systems described herein may perform step 304 in a variety of ways. In one example, identification module 104 may (1) identify the originating IP address of each reputation request received by reputation service 206 and then (2) determine, by comparing this IP address with organization information 124 within database 120 in FIG. 1, whether this IP address matches any of the IP addresses associated with organizations stored within organization information 124. In some examples, by performing this process for each and every reputation request serviced by reputation service 206, identification module 104 may accurately identify reputation requests that originate from an external IP address (or addresses) of a particular organization.

Returning to FIG. 3, at step 306 the systems described herein may generate, based at least in part on an analysis of the reputation requests that originated from the external IP address(es) associated with the organization, at least one report or the organization that identifies the activity of devices within the organization. For example, report module 106 may, as part of reputation service 206 in FIG. 2, generate a report for organization 208 that identifies the activity of devices within organization 208.

The report generated in step 306 may contain any type or form of information that may be gathered, obtained, inferred, deduced, implied, etc. from the reputation requests identified in step 304. In some examples, this report may include information that identifies computing resources accessed by devices within the organization (as identified by the reputation requests themselves). For example, the report may identify websites visited by devices within the organization (which may include, e.g., websites hosting inappropriate material or content, such as pornography, malware, violent or hate-speech content, gambling content, or the like), emails sent or received by devices within the organization (which may include, e.g., phishing or spam-related emails), software applications installed or executed by devices within the organization (which may include, e.g., inappropriate software applications such as file-sharing utilities, games, or the like), or any other computing resource.

In some examples, report module 106 may draw, and then include within a report for an organization, at least one conclusion, inference, implication, etc. based at least in part upon an analysis of the reputation requests identified in step 304. For example, report module 106 may identify, and then include information within a report for an organization that identifies, the number of managed and unmanaged devices within the organization. For example, as illustrated in FIG. 5, report 502 may include information that indicates that 197 managed devices and 42 unmanaged devices appear to exist within organization 208. As indicated above, report module 106 may determine the number of managed and unmanaged devices within an organization by determining whether reputation requests that originate from IP addresses that are associated with the organization indicate whether the devices that generated such requests represent managed devices.

In some examples, report module 106 may also identify, and include within a report for an organization, information that contrasts the activity of managed devices within the organization with the activity of unmanaged devices within the organization. For example, report module 106 may generate, and then include within report 506, information that contrasts the number of malware detections experienced by managed devices within the organization with the number of malware detections experienced by unmanaged devices within the organization, information that contrasts the number of content-policy violations generated by managed devices within the organization with the number of content-policy violations generated by unmanaged devices within the organization, or any other information that may be useful in comparing or contrasting the activity of managed devices and unmanaged devices within the organization. In some examples, by comparing the activity of managed devices with unmanaged devices in this manner, providers of device-management software may be able to highlight the advantages of such software using real-world data.

In some examples, the report generated in step 306 may also include information that identifies potential relationships between computing resources accessed by devices within the organization. For example, report module 106 may, by tracking the activity of devices within the organization (using, e.g., the unique identifiers that may be included within each device's reputation requests), determine that devices within the organization always encounter a particular instance of malware upon accessing a particular spam email or website. In this example, report module 106 may include information within a report to the organization that identifies a potential relationship between the spam email or website accessed and the attack experienced. In some examples, this information may enable the organization to adjust its internal content-management policies in order to avoid such attacks in the future.

Information contained within the report generated in step 306 may be organized in a variety of ways. In one example, this information may be organized by geographic area and/or specific offices associated with the organization. For example, if an organization indicates to reputation service 206 that specific external IP addresses of the organization represent specific offices or specific geographic areas, then report module 106 may organize the information contained within a report for this organization based on this information. For example, as illustrated in FIG. 5, the information contained within report 502 may be organized by office or geographic area, thus enabling organization 208 to quickly and easily identify and distinguish between the activity of various offices and geographic regions.

Returning to FIG. 3, at step 308 the systems described herein may provide the report generated in step 306 to the organization to enable the organization to monitor the activity of devices within the organization. For example, communication module 108 may, as part of reputation service 206 in FIG. 2, provide report 502 in FIG. 5 to organization 208.

The systems described herein perform step 308 in a variety of ways. In one example, communication module 108 may provide the report to the organization on a periodic basis. For example, report module 106 may generate, and communication module 108 may provide, a periodic report to organization 208 that identifies the activity of devices within organization 208 on a weekly, monthly, annual, or other periodic basis.

In another example, the systems described herein may provide the report in response to determining that a predetermined alert threshold has been satisfied. For example, if report module 106 detects a sudden increase (as determined by, e.g., a predetermined threshold) in undesirable activity within organization 208 (such as an increase in the number of malware detections, phishing attacks, or the like), then report module 106 may generate, and communication module 108 may provide, a report that identifies this increased undesirable activity to organization 208.

Upon completion of step 308, the logical flow of exemplary method 300 in FIG. 3 may terminate.

As detailed above, by leveraging data generated by an existing security solution deployed within an organization (such as antivirus software configured to generate reputation requests for information relevant to evaluating the trustworthiness of computing resources encountered by devices within the organization), the systems and methods described herein may be able to effectively monitor the activity of devices within the organization. In addition, by generating detailed reports for the organization based on an analysis of this data, the systems and methods described herein may enable such an organization to effectively monitor and/or manage both sanctioned and non-sanctioned (e.g., employee-owned) devices within the organization without having to deploy and/or maintain additional costly and/or burdensome device-management software, potentially reducing both the organization's costs and management burden.

Figure 6:
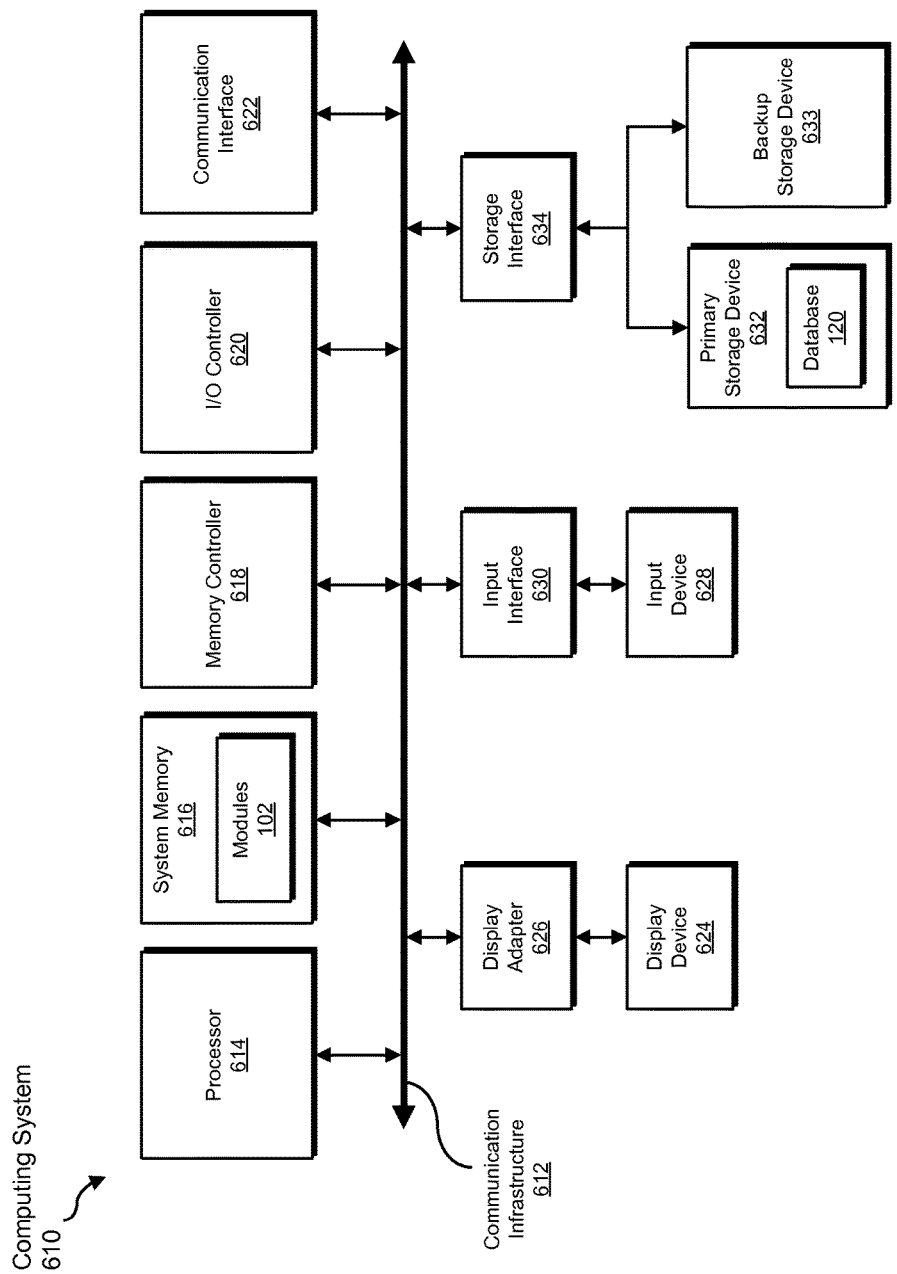
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 410 may perform and/or be a means for performing, either alone or in combination with other elements, one or more of the identifying, generating, analyzing, providing, receiving, and including steps described herein. All or a portion of computing system 410 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
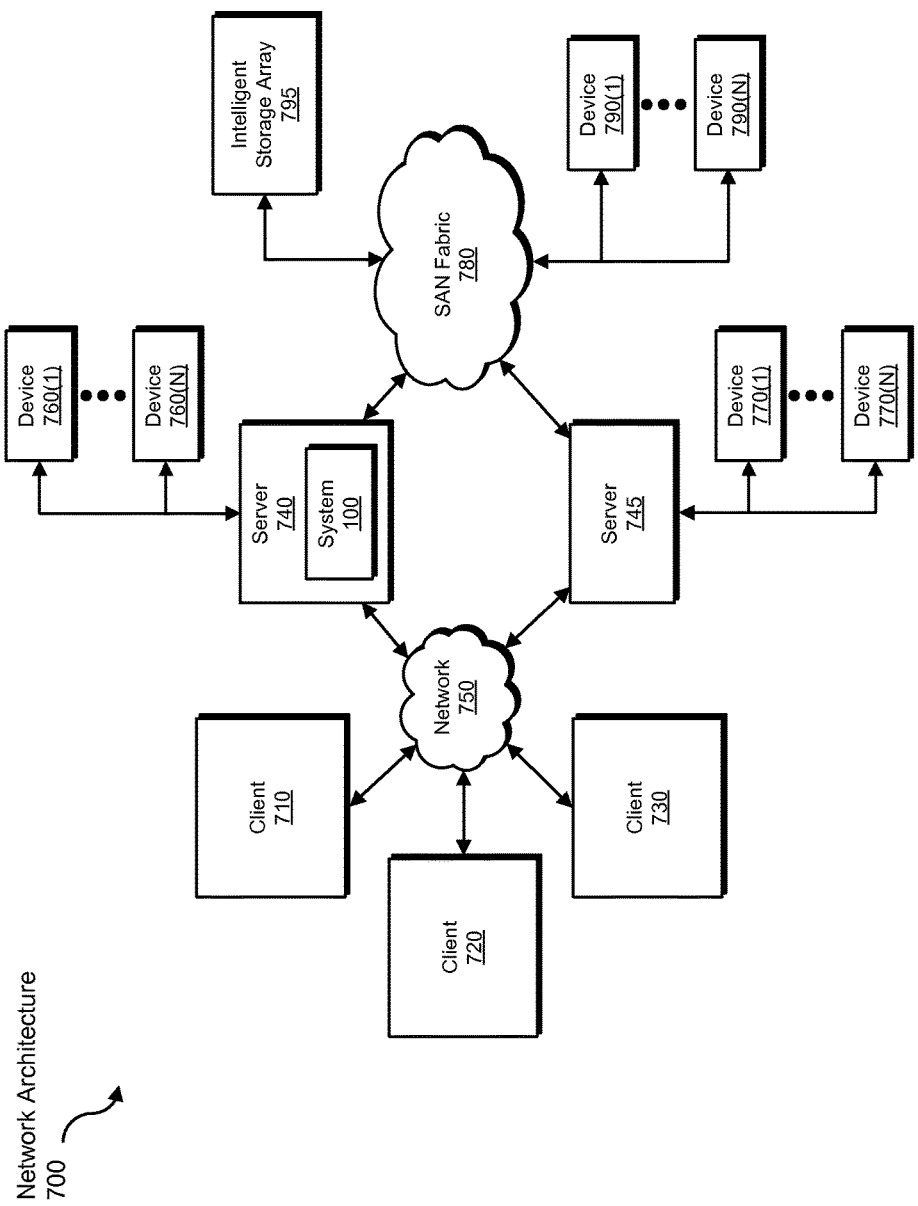
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, generating, analyzing, providing, receiving, and including steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for monitoring the activity of devices within an organization by leveraging data generated by an existing security solution deployed within the organization.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform reputation service 206 into a system capable of monitoring the activity of devices within an organization based on reputation requests received from such devices.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for monitoring the activity of devices within an organization by leveraging data generated by an existing security solution deployed within the organization, the method comprising:
　identifying one or more external IP addresses associated with the organization;
　receiving, at a reputation service, a reputation request from a device for reputation information relevant to evaluating the trustworthiness of a computing resource encountered by the device, wherein the reputation service comprises at least one processor configured to service reputation requests for devices within the organization;
　determining that the reputation request originated from at least one of the one or more external IP addresses associated with the organization by:
　　identifying an originating IP address of the reputation request received from the device;
　　comparing the originating IP address of the reputation request with the one or more external IP addresses associated with the organization;
　　determining that the originating IP address of the reputation request matches at least one of the one or more external IP addresses associated with the organization;
　responding, via the reputation service, to the reputation request by providing the requested reputation information to the device;
　in addition to responding to the reputation request, using data generated from servicing the reputation request to track, for the organization, the activity of the device, wherein using the data to track the activity of the device comprises:
　　generating, via the reputation service, at least one employee-activity report for the organization that identifies the activity of the device, wherein:
　　　the reputation service generates the report based at least in part on an analysis of the reputation request without using a separate monitoring service to generate the report;
　　　the report includes information that identifies the number of managed devices and unmanaged devices within the organization and information that contrasts the activity of managed devices within the organization with the activity of unmanaged devices within the organization;
　　providing, via the reputation service, the report to the organization to enable the organization to monitor and/or manage the activity of the device.

2. The method of claim 1, wherein generating the report for the organization comprises including information within the report that identifies at least one conclusion drawn by analyzing the reputation request.

3. The method of claim 1, wherein the reputation request comprises at least one of:
　a unique identifier that uniquely identifies the device;
　information that uniquely identifies the computing resource for which the reputation information is requested;
　information indicating whether the device represents a managed device.

4. The method of claim 1, wherein:
　the report for the organization includes information that identifies activity of a plurality of devices within the organization, the plurality of devices comprising the device;

the information that identifies the activity of the plurality of devices is generated based on an analysis of reputation requests received from the plurality of devices, the analysis of the reputation requests including the analysis of the reputation request originating from the device.

5. The method of claim 4, wherein the reputation service determines that the plurality of devices are within the organization by:
identifying an originating IP address of each reputation request received from the plurality of devices;
comparing the originating IP address of each of the received reputation requests with the one or more external IP addresses associated with the organization;
determining that each of the originating IP addresses matches at least one of the one or more external IP address associated with the organization.

6. The method of claim 4, wherein generating the report for the organization comprises including information within the report that identifies potential relationships between computing resources accessed by the plurality of devices within the organization.

7. The method of claim 1, further comprising:
determining, based on the determination that the originating IP address of the reputation request matches at least one of the one or more external IP addresses associated with the organization, that the user of the device is an employee of the organization;
including the activity of the device in the report based on the determination that the user of the device is an employee of the organization.

8. The method of claim 1, wherein generating the report for the organization comprises generating the report by organizing information within the report by at least one of:
specific offices of the organization;
specific geographic areas.

9. A system for monitoring the activity of devices within an organization by leveraging data generated by an existing security solution deployed within the organization, the system comprising:
an identification module, a report module, and a communication module operating as part of a reputation service that services reputation requests for devices within the organization, wherein the identification module, the report module, and the communication module are programmed to:
identify one or more external IP addresses associated with the organization;
receive a reputation request from a device for reputation information relevant to evaluating the trustworthiness of a computing resource encountered by the device;
determine that the reputation request originated from at least one of the one or more external IP addresses associated with the organization by:
identifying an originating IP address of the reputation request received from the device;
comparing the originating IP address of the reputation request with the one or more external IP addresses associated with the organization;
determining that the originating IP address of the reputation request matches at least one of the one or more external IP addresses associated with the organization;
respond to the reputation request by providing the requested reputation information to the device;
in addition to responding to the reputation request, use data generated from servicing the reputation request to track, for the organization, the activity of the device, wherein the identification module, the report module, and the communication module are programmed to use the data to track the activity of the devices by:
generating, via the reputation service, at least one employee-activity report for the organization that identifies the activity of the device, wherein:
the reputation service generates the report based at least in part on an analysis of the reputation request without using a separate monitoring service to generate the report;
the report includes information that identifies the number of managed devices and unmanaged devices within the organization and information that contrasts the activity of managed devices within the organization with the activity of unmanaged devices within the organization;
providing, via the reputation service, the report to the organization to enable the organization to monitor and/or manage the activity of the device;
at least one processor configured to execute the identification module, the report module, and the communication module.

10. The system of claim 9, wherein the report module includes, within the report, information that identifies at least one conclusion drawn by analyzing the reputation request.

11. The system of claim 9, wherein the reputation request comprises at least one of:
a unique identifier that uniquely identifies the device;
information that uniquely identifies the computing resource for which the reputation information is requested;
information indicating whether the device represents a managed device.

12. The system of claim 9, wherein:
the report for the organization includes information that identifies activity of a plurality of devices within the organization, the plurality of devices comprising the device;
the report module generates the information that identifies the activity of the plurality of devices based on an analysis of reputation requests received from the plurality of devices, the analysis of the reputation requests including the analysis of the reputation request originating from the device.

13. The system of claim 12, wherein the report module is programmed to generate the report for the organization by including information within the report that identifies potential relationships between computing resources accessed by the plurality of devices within the organization.

14. The system of claim 9, wherein the report module is further programmed to:
determine, based on the determination that the originating IP address of the reputation request matches at least one of the one or more external IP addresses associated with the organization, that the user of the device is an employee of the organization;
include the activity of the device in the report based on the determination that the user of the device is an employee of the organization.

15. The system of claim 12, wherein the report module is programmed to generate the report by organizing information within the report by at least one of:

specific offices of the organization;
specific geographic areas.

16. The system of claim 9, wherein the communication module is programmed to provide the report to the organization by at least one of:
   providing the report on a periodic basis;
   providing the report in response to determining that a predetermined alert threshold has been satisfied.

17. A non-transitory computer-readable-storage medium comprising one or more computer-executable instructions that, when executed by at least one processor of a reputation service, cause the reputation service to:
   identify one or more external IP addresses associated with an organization;
   receive, at a reputation service, a reputation request from a device for reputation information relevant to evaluating the trustworthiness of a computing resource encountered by the device, wherein the reputation service comprises at least one processor configured to service reputation requests for devices within the organization;
   determine that the reputation request originated from at least one of the one or more external IP addresses associated with the organization by:
      identifying an originating IP address of the reputation request received from the device;
      comparing the originating IP address of the reputation request with the one or more external IP addresses associated with the organization;
      determining that the originating IP address of the reputation request matches at least one of the one or more external IP addresses associated with the organization;
   respond, via the reputation service, to the reputation request by providing the requested reputation information to the device;
   in addition to responding to the reputation request, use data generated from servicing the reputation request to track, for the organization, the activity of the devices, wherein using the data to track the activity of the device comprises:
      generating, via the reputation service, at least one employee-activity report for the organization that identifies the activity of the device, wherein:
         the reputation service generates the report based at least in part on an analysis of the reputation request without using a separate monitoring service to generate the report;
         the report includes information that identifies the number of managed devices and unmanaged devices within the organization and information that contrasts the activity of managed devices within the organization with the activity of unmanaged devices within the organization;
      providing, via the reputation service, the report to the organization to enable the organization to monitor and/or manage the activity of the device.

18. The non-transitory computer-readable-storage medium of claim 17, wherein the one or more computer-executable instructions, when executed by the processor of the reputation service, further cause the reputation service to generate the report for the organization by including information within the report that identifies at least one conclusion drawn by analyzing the reputation request.

19. The method of claim 1, wherein identifying the one or more external IP addresses associated with the organization comprises receiving the one or more external IP addresses from the organization during a registration process administered by the reputation service.

20. The method of claim 1, wherein at least one of the one or more external IP addresses associated with the organization comprise at least one of:
   a static IP address assigned to the organization;
   a dynamic IP address assigned to the organization.

* * * * *